US006007857A

United States Patent [19]

Kimura et al.

[11] Patent Number: 6,007,857

[45] Date of Patent: Dec. 28, 1999

[54] PROCESS FOR PRODUCING GRANULAR COCOA

[75] Inventors: Yoshiharu Kimura; Masakazu Terauchi, both of Saitama, Japan

[73] Assignee: Meiji Seika Kaisha Ltd., Tokyo, Japan

[21] Appl. No.: 09/098,547

[22] Filed: Jun. 17, 1998

[30] Foreign Application Priority Data

Jun. 20, 1997 [JP] Japan .................................... 9-164548

[51] Int. Cl.$^{6}$ ........................................................ A23G 1/00

[52] U.S. Cl. .......................... 426/285; 426/631; 426/453; 426/455; 426/456

[58] Field of Search .................................... 426/274, 285, 426/631, 453, 455, 456

[56] References Cited

FOREIGN PATENT DOCUMENTS 62-272941 11/1987 Japan ............................... A23G 1/00

*Primary Examiner*—Milton Cano

*Attorney, Agent, or Firm*—Sughrue, Mion, Zinn, Macpeak & Seas, PLLC

[57] ABSTRACT

A process for producing granular cocoa which comprises granulating cocoa powder in a fluidized bed while spraying with a liquid binder prepared by heating cocoa powder and/or cacao extract with or without water to obtain granules having a water content of 15 to 40% by weight, and then drying the granules with hot air in a fluidized bed. The resulting granular cocoa easily dissolves in warm milk or warm water without preliminary kneading.

21 Claims, No Drawings

PROCESS FOR PRODUCING GRANULAR COCOA

FIELD OF THE INVENTION

This invention relates to a process for producing soluble cocoa granules which dissolve easily in warm milk or warm water without requiring preliminary kneading.

BACKGROUND OF THE INVENTION

Conventional cocoa powder hardly dissolves. It readily forms masses if directly added to hot water or hot milk. For drinking, therefore, cocoa powder must be preliminarily kneaded with a small amount of warm water or warm milk so as not to form masses and then diluted to a desired concentration. On the other hand, compounded cocoa, which is prepared from cocoa powder, sugar, powdered milk, etc., can easily be granulated usually by wet granulation. Compounded cocoa containing soluble ingredients, such as sugar, in a large proportion, is easy to dissolve. Furthermore, compounded cocoa available on the market and which is ready to dissolve even in cold milk or water can be prepared by coating cocoa powder with an emulsifier, such as lecithin, followed by granulating as described, for example, in JP-A-62-272941 (the term "JP-A" as used herein means an "unexamined published Japanese patent application"). Thus, various techniques have been proposed relating to the solubility of compounded cocoa, but a technique for making cocoa powder itself soluble has not yet been developed.

The reason why cocoa powder hardly dissolves and readily forms masses upon dissolving seems to reside in that cocoa powder (1) has a high insoluble content, such as fiber, (2) has a fat (cacao butter) content of 8% or more, and (3) has a finely powdered form so as not to impart a rough texture to the mouth. Granulation of cocoa powder could be a solution to the problem of poor solubility, but it is very difficult to apply granulating techniques commonly employed in the preparation of compounded cocoa to cocoa powder itself. Although mere granulation of cocoa powder is possible by adopting some known techniques, such as extrusion granulation or compression granulation, the resulting granules are too hard to be dispersed and disintegrated on stirring in water, etc., and are therefore not practical.

SUMMARY OF THE INVENTION

It is therefore an object of the present invention to provide a process for producing soluble cocoa granules which dissolve easily in warm milk or warm water without requiring preliminary kneading.

As a result of extensive study, the present inventors have found that granular cocoa easily soluble in warm water or warm milk can be obtained by using a paste of cocoa powder as a binder in granulating cocoa powder. Further investigation led to the present invention.

That is, the above object of the present invention has been achieved by providing a process for producing granular cocoa which comprises granulating cocoa powder in a fluidized bed while spraying the cocoa powder with a liquid binder prepared from at least one of cocoa powder and a cacao extract to obtain cocoa granules having a water content of 15 to 40% by weight, and then drying the cocoa granules.

In preferred embodiments, the binder liquid is prepared by heating at least one of cocoa powder and cacao extract with or without water. Furthermore, the drying step comprises drying the cocoa granules with hot air in a fluidized bed.

The granular cocoa obtained by the process of the present invention is markedly superior to conventional cocoa powder in solubility in warm milk or warm water. Since it easily disperses and dissolves on pouring hot milk or hot water without requiring preliminary kneading, hot chocolate can be made to one's taste just like instant coffee. When the process of the present invention is followed, granular cocoa can be obtained solely from pure cocoa, which has a fat content of 22% by weight or more and may contain only vanilla flavors. Besides having excellent solubility, the granular cocoa of the invention is free from dusting and therefore is expected to be convenient for consumers to handle.

DETAILED DESCRIPTION OF THE INVENTION

The process for producing granular cocoa comprises preparing a liquid binder, fluidized bed granulation, and drying. The present invention will be described in detail in this order of steps.

Because cocoa powder has no binding properties of itself, cocoa powder must be sprayed with a liquid binder when granulated. While carbohydrates are usually used as a binder in the food industry, it has been found that cocoa powder that has no binding properties of itself can serve as a binder on heating with water at 50 to 90° C. The binding ability of the heated cocoa powder seems attributable to gelatinization of the glucides (starch) present in cocoa powder in a proportion of about 40 to 50% by weight. The binding ability of cocoa powder depends on the kind of cocoa. In general, alkali-treated cocoa powder becomes more viscous to exhibit a higher binding strength than natural cocoa powder. A cacao extract, which is obtained by dissolving cacao mass or cocoa powder in water and extracting the water-soluble portion while hot, contains about 58% by weight of glucides based on its solids content. Therefore, a cacao extract has a higher binding strength than cocoa powder itself.

The liquid binder which can be used in the present invention is prepared by heating cocoa powder having a fat content of 8 to 30% by weight, a cacao extract having a water-soluble solids content of 5 to 95% by weight or a mixture thereof with or without water.

Addition of water is unnecessary where an undried cacao extract or a cacao extract to which water has been added is used as a raw material, and the resulting liquid binder has a water-soluble solids content of not more than 30% by weight.

If desired, the binding force of the liquid binder can be increased by adding thickening polysaccharides, which are carbohydrate binders, such as starch (e.g., waxy starch), pullulan, guar gum and xantham gum, in an amount of 0.5 to 3% by weight based on the total liquid binder.

The water-soluble solids content of the liquid binder is adjusted to 5 to 30% by weight by adding water. While the binding force increases as the concentration increases, the viscosity of the liquid binder should be such that the binder liquid is sprayable. The highest water-soluble solids content consistent with sprayability is 30% by weight when using a cacao extract alone or 15% by weight when using cocoa powder alone. If the water-soluble solids content of a liquid binder is less than 5% by weight, a binding force is hardly expected whichever raw material may be used.

The heating temperature for preparing the liquid binder is preferably 50 to 90° C. At temperatures lower than 50° C., gelatinization of the glucides (increase of viscosity) tends to be insufficient. If the heating temperature exceeds 90° C., the cocoa powder to be granulated tends to scorch, or the flavor components of cocoa evaporate to ruin the taste.

Fluidized bed granulation of cocoa powder is carried out by fluidizing cocoa powder having a fat content of 8 to 30% by weight in a fluidized bed granulator while spraying the fluidized cocoa powder with the liquid binder in an amount so as to give the cocoa powder to be granulated a water-soluble solids content of 2 to 20% by weight based on the weight of the cocoa powder, whereby the cocoa particles are gradually bound together into granules. In the initial stage of granulation, the cocoa powder must be kept at a temperature not higher than 30° C. for the following reason. While temperature has little influence on low-fat cocoa powder, the fluidity of cocoa powder having a fat content of 20% or higher begins to decrease at around 30° C., which is the melting point of cacao butter. At 35° C. or higher the cocoa powder shows considerably reduced fluidity, and sticks to the inner wall of the granulator. At last the fluidity is lost, and granulation is no more possible. The temperature of granulation in the initial stage, particularly at the very beginning is preferably as low as possible, depending on the fat content of cocoa powder. Once particles grow to some extent, the fluidity can be maintained if the temperature rises above the melting point of cacao butter.

Because a low granulating temperature is used as described above, most of the water content of the liquid binder sprayed onto the cocoa powder remains in the granular cocoa. The residual water content is of great importance for granulating of cocoa powder. In general fluidized bed granulation, a powder is fluidized with hot air at about 60° C. while being sprayed with a liquid binder. Therefore, in most cases, the temperature of the powder or granules rises to 40° C. or higher, and by the time the spraying is completed, the residual water content of the resulting granules has decreased to 10% by weight or less. However, this cannot be applied to granulation of cocoa powder alone because of the extremely poor granule-forming properties of cocoa powder. It is necessary for the cocoa granules to have a water content of 15 to 40% by weight at the time that the spraying is completed. While powder having such a high water content generally gets pasty, cocoa powder has water-holding properties because of its high insoluble fiber content and retains its granular state despite a high water content. If the water content is lower than 15%, cocoa powder does not grow into solid granules but rather grows into brittle granules which easily collapse during subsequent drying. Granules having a high water content show relatively high cohesion and hardly collapse during drying. With the amount of the water-soluble solids applied to cocoa powder being equal, granules which are obtained by using a thinner liquid binder to thereby gain a higher water content on completion of spraying are larger and more solid than those obtained by using a thicker liquid binder.

After completing spraying of the liquid binder and confirming the formation of granules, the granules are subjected to fluidized drying at 90 to 120° C. until the water content decreases to 7% by weight or less. It is desirable to complete the drying in a short time because a high temperature is consistent with maintaining the flavor. While drying requires a relatively long time when the granules have an extremely high residual water content, it is important to minimize the collapse of the granules during drying to prevent a reduction in solubility of the final product.

At the end of drying, the temperature of the granular cocoa reaches about 50° C. so that the fat (cacao butter) of cocoa powder is in a completely molten state. Therefore, the granules are cooled to convert the cacao butter into a stable crystal form. The manner of cooling largely influences the quality of the resulting granular cocoa. When the granules are cooled in a fluidized bed for 10 to 30 minutes to reduce the temperature to 20° C. or lower, the cacao butter is converted to stable crystals. Unless cooled in this manner, the granules tend to turn grayish or whiten soon under some storage conditions probably because the cocoa butter crystals become coarse.

The present invention will now be illustrated in greater detail with reference to the following Examples, but it should be understood that the present invention is not to be construed as being limited thereto. Unless otherwise noted, all the percentages are given by weight.

EXAMPLE 1

Cocoa powder having a fat content of 22 to 24% and water at a weight ratio of 25:75 were mixed and heated in a steam kiln at 80° C. to obtain a liquid binder having a water-soluble solids content of 8%. Cocoa powder having a fat content of 22 to 24% was fluidized in a fluidized bed granulator while keeping the temperature at 30° C., and granulated by spraying an equal weight (100% based on the weight of the cocoa powder) of the liquid binder to obtain granules having a water content of 25% (a water-soluble solids content based on the cocoa powder: 8%). The granules were dried in a fluidized bed at a temperature of 100° C. at the intake vent for 30 minutes to obtain granules having a water content of 7% or less. The granules were then cooled to 20° C. or lower to obtain granular cocoa.

EXAMPLE 2

A liquid binder having a water-soluble solids content of 24% was prepared in the same manner as in Example 1, except for using a cacao extract having a water-soluble solids content of 30% and water at a weight ratio of 80:20. Cocoa powder having a fat content of 22 to 24% was granulated in a fluidized bed granulator while being sprayed with the liquid binder in an amount of 80% based on the weight of the cocoa powder to obtain granules having a water content of 25% (a water-soluble solids content based on the cocoa powder: 12%). The resulting granules were dried in the same manner as in Example 1 to obtain granular cocoa.

EXAMPLE 3

A liquid binder having a water-soluble solids content of 24% was prepared in the same manner as in Example 1, except for using cacao powder having a fat content of 22 to 24%, waxy starch, and water at a weight ratio of 20:5:75. Cocoa powder having a fat content of 22 to 24% was granulated by using the resulting liquid binder (a water-soluble solids content based on the cocoa powder: 8%) and dried in a fluidized bed in the same manner as in Example 1 to obtain granular cocoa.

TEST EXAMPLE 1

Solubility of Granular Cocoa

Solubility of the granular cocoa prepared in Example 1 in warm milk was compared with that of untreated pure cocoa powder.

In a beaker was placed 4 g of the granular cocoa or untreated cocoa powder, and 100 g of milk warmed to 60° C. was poured therein. The milk was stirred 5, 10 or 20 times at a speed of 2 stirs per second with a spatula, and the solubility was evaluated by rating the state of dissolution according to the following criteria. The results obtained are shown in Table 1.

Evaluation Criteria

A . . . The particles completely dissolved.

B . . . Masses of powder remained sparsely present.

C . . . The particles formed many floating masses.

TABLE 1

| | Number of Stirs | | |
|---|---|---|---|
| | 5 | 10 | 20 |
| Granulated | B | A | A |
| Untreated | C | C | B–C |

The above results show that the granular cocoa obtained in Example 1 is easily soluble in warm milk.

TEST EXAMPLE 2

Relationship between Water-soluble Solids Content Applied to Cocoa Powder and Solubility of Granular Cocoa Liquid Binders having a water-soluble solids content varying from 2 to 30% were prepared from cocoa powder having a fat content of 22 to 24% or a cacao extract having a water-soluble solids content of 30% and water, and sprayability was evaluated.

Cocoa powder was granulated using each of the liquid binders and dried in the same manner as in Example 1. The amount of the liquid binder that was sprayed was varied so as to provide a water-soluble solids content as indicated in Table 2 based on the weight of the cocoa powder to be granulated. Solubility of the resulting granular cocoa was tested in the same manner as in Example 1. The number of stirs was fixed at 15. The evaluation was made based on the following criteria.

A . . . The particles-completely dissolved.

B . . . Masses of powder remained sparsely present.

C . . . The particles showed good wettability but formed much sediment.

D . . . The particles formed many floating masses.

The test results of the granular cocoa prepared using a liquid binder of cocoa powder and those of the granular cocoa prepared using a liquid binder of cacao extract are shown in Tables 2 and 3, respectively.

TABLE 2

Liquid Binder Prepared from Cocoa Powder

| Sprayed Water-soluble Solids Content (%)* | Water-soluble Solids Content in Liquid Binder (%) 2 | 5 | 10 | 15 | 20 | 30 |
|---|---|---|---|---|---|---|
| 2 | D | B–D | D | D | — | — |
| 5 | D | B | B | B | — | — |
| 10 | D | A–B | A | A | — | — |
| 20 | D | D | A | A | — | — |
| 30 | D | D | C | C | — | — |
| Sprayability | good | good | good | good | no good | no good |

*Based on the weight of the cocoa powder to be granulated.

TABLE 3

Liquid Binder Prepared from Cacao Extract

| Sprayed Water-soluble Solids Content (%)* | Water-soluble Solids Content in Liquid Binder (%) 2 | 5 | 10 | 15 | 20 | 30 |
|---|---|---|---|---|---|---|
| 2 | D | B–D | B–D | D | D | D |
| 5 | D | B | B | B | B | D |
| 10 | D | B | A | A | A | B |
| 20 | D | D | A | A | A | A |
| 30 | D | D | C | C | A–C | C |
| Sprayability | good | good | good | good | good | no good |

*Based on the weight of the cocoa powder to be granulated.

In Tables 2 and 3, the conditions surrounded by thick lines and a double line provided superior wettability as compared to the untreated cocoa powder (the property of not forming floating masses), and those surrounded by the double line and dotted lines provided superior wettability but resulted in too much hardness for easy disintegration.

In order to obtain granular cocoa having superior solubility, it is preferred, as verified above, to use a liquid binder having a water-soluble solids content of 5 to 30% and to spray the liquid binder in an amount so as to give the cocoa powder to be granulated a water-soluble solids content of 2 to 20% based on the weight of the cocoa powder.

TEST EXAMPLE 3

Relationship between Heating Temperature and Viscosity in Preparing Liquid Binder Liquid binders were prepared from cocoa powder having a fat content of 22 to 24% or a cacao extract having a water-soluble solids content of 30% in the same manner as in Example 1 or 2, respectively. In order to examine the relationship between the heating temperature and the viscosity, the liquid binder was slowly heated to 90° C. and then slowly cooled to 50° C., and the change in viscosity with a change in temperature was measured with a Brookfield type viscometer. The results obtained are shown in Table 4.

TABLE 4

Change in Viscosity (cps) with Temperature

| Binder Material | Temperature Change (° C.) → r.t.* | 40 | 50 | 70 | 80 | 90 | 70 | 50 |
|---|---|---|---|---|---|---|---|---|
| Cocoa Powder | 9 | 20 | 35 | 58 | 160 | 175 | 140 | 160 |
| Cacao Extract | 21 | 360 | 450 | 1230 | 1200 | 1020 | 932 | 1020 |

*Room temperature

The viscosity of both liquid binders began to rise from about 50° C., and after reaching a maximum at 80 to 90° C., the viscosity did not decrease with a decrease in temperature. In the liquid binder prepared from cocoa powder, when the temperature is reduced to about 30° C., the fat content (cacao butter) starts to crystallize. This tends to increase the viscosity too high to allow the liquid binder to be sprayed. Therefore, the liquid binder prepared from cocoa powder is preferably sprayed while warm at 40° C. or higher.

While the invention has been described in detail and with reference to specific examples thereof, it will be apparent to one skilled in the art that various changes and modification can be made therein without departing from the spirit and scope thereof.

What is claimed is:

1. A process for producing granular cocoa which comprises the steps of granulating cocoa powder in a fluidized bed while spraying the cocoa powder with a liquid binder prepared from at least one of cocoa powder and cacao extract to obtain cocoa granules having a water content of 15 to 40% by weight, and then drying the cocoa granules.

2. A process according to claim 1, wherein said liquid binder is prepared by heating at least one of cocoa powder and cacao extract with or without water.

3. A process according to claim 2, which comprises the step of heating at least one of cocoa powder and cacao extract with or without water at 50 to 90° C.

4. A process according to claim 1, wherein said liquid binder is prepared by heating at least one of cocoa powder having a fat content of 8 to 30% by weight, a cacao extract having a water-soluble solids content of 5 to 95% by weight or a mixture thereof with or without water.

5. A process according to claim 1, which comprises the step of spraying with a liquid binder having a water-soluble solids content of 5 to 30% by weight in amount so as to give the cocoa powder to be granulated a water-soluble solids content of 2 to 20% by weight based on the weight of the cocoa powder.

6. A process according to claim 5, which comprises the step of spraying with a liquid binder prepared from cacao extract having a water-soluble solids content of 5 to 30% by weight.

7. A process according to claim 5, which comprises the step of spraying with a liquid binder prepared from cocoa powder having a water-soluble solids content of 5 to 15% by weight.

8. A process according to claim 1, wherein said liquid binder comprises a carbohydrate binder.

9. A process according to claim 1, wherein said liquid binder contains a carbohydrate binder in an amount of up to 3% by weight based on the total liquid binder.

10. A process according to claim 1, wherein said drying step comprises drying said cocoa granules with hot air in a fluidized bed.

11. A process according to claim 1, which comprises the step of drying said cocoa granules at 90 to 120° C. until the water content of the granules decreases to 7% by weight or less.

12. A process according to claim 10, which comprises the step of drying said cocoa granules at 90 to 120° C. until the water content of the granules decreases to 7% by weight or less.

13. A process according to claim 1, which further comprises the step of cooling the dried granules to a temperature of 20° C. or lower over a period of 10 to 30 minutes.

14. A process according to claim 10, which further comprises the step of cooling the dried granules to a temperature of 20° C. or lower over a period of 10 to 30 minutes.

15. A process for producing granular cocoa which comprises the steps of providing a liquid binder prepared by heating at least one of cocoa powder and cacao extract with or without water, granulating cocoa powder in a fluidized bed while spraying the cocoa powder with the liquid binder to obtain cocoa granules having a water content of 15 to 40% by weight, and then drying the cocoa granules with hot air in a fluidized bed.

16. A process according to claim 15, which comprises the step of spraying with a liquid binder having a water-soluble solids content of 5 to 30% by weight in amount so as to give the cocoa powder to be granulated a water-soluble solids content of 2 to 20% by weight based on the weight of the cocoa powder.

17. A process according to claim 16, which comprises the step of spraying with a liquid binder prepared from cacao extract having a water-soluble solids content of 5 to 30% by weight.

18. A process according to claim 16, which comprises the step of spraying with a liquid binder prepared from cocoa powder having a water-soluble solids content of 5 to 15% by weight.

19. A process according to claim 15, which comprises the step of drying said cocoa granules at 90 to 120° C. until the water content of the granules decreases to 7% by weight or less.

20. A process according to claim 15, which further comprises the step of cooling the dried granules to a temperature of 20° C. or lower over a period of 10 to 30 minutes.

21. A process for producing granular cocoa which comprises the steps of providing a liquid binder prepared by heating at least one of cocoa powder and cacao extract with or without water, fluidizing cocoa powder, spraying the fluidized cocoa powder with the liquid binder to obtain cocoa granules having a water content of 15 to 40% by weight, and then drying the cocoa granules.

* * * * *